United States Patent [19]

Sandvig

[11] 4,073,967
[45] Feb. 14, 1978

[54] METHOD FOR RENDERING SUBSTRATES RESISTANT TO ABRASION

[75] Inventor: Timothy C. Sandvig, Woodville, Wis.

[73] Assignee: Minnesota Mining and Manufacturing Company, St. Paul, Minn.

[21] Appl. No.: 728,951

[22] Filed: Oct. 4, 1976

Related U.S. Application Data

[62] Division of Ser. No. 513,116, Oct. 8, 1974, abandoned.

[51] Int. Cl.² ............................................. B05D 3/06
[52] U.S. Cl. ................................. 427/44; 204/159.13;
260/2 S; 260/2 T; 260/448.2 E; 427/54;
427/299; 427/307; 427/322; 427/385 A;
427/385 B; 427/388 R
[58] Field of Search ................. 427/372 R; 428/412,
428/447, 457; 260/2 S, 2 T, 448.2 E; 427/44,
54, 307, 322, 299, 372 R, 385 A, 385 B, 388 R;
204/159.13

[56] References Cited

U.S. PATENT DOCUMENTS

| | | | |
|---|---|---|---|
| 3,013,993 | 12/1961 | Rust et al. | 260/2 T |
| 3,061,483 | 10/1962 | Coles et al. | 204/159.13 |
| 3,321,350 | 5/1967 | Fekete | 156/329 |
| 3,324,055 | 6/1967 | Marks et al. | 260/17 R |
| 3,642,681 | 2/1972 | Hermes | 260/292.2 M |
| 3,650,808 | 3/1972 | Gagnon | 428/412 |
| 3,708,225 | 1/1973 | Misch et al. | 351/160 |
| 3,766,123 | 10/1973 | Burnie et al. | 260/2 T |
| 3,775,171 | 11/1973 | Hermes | 428/412 |
| 3,817,905 | 6/1974 | Lerner et al. | 260/37 R |

FOREIGN PATENT DOCUMENTS 1,473,183  2/1967  France.

OTHER PUBLICATIONS

Zhinkina et al., "Chem. Abstracts" V69, 107312 (1968).

Primary Examiner—John H. Newsome
Attorney, Agent, or Firm—Cruzan Alexander; Donald M. Sell; James V. Lilly

[57] ABSTRACT

A method for rendering a surface of a substrate resistant to abrasion comprising applying to the substrate and then curing a composition comprising: (1) a reactive silane and (2) a metal ester. Certain compositions can be cured by means of heat, ultraviolet light, or electron beam irradiation. Cured coatings are also corrosion and solvent resistant.

48 Claims, 1 Drawing Figure

METHOD FOR RENDERING SUBSTRATES RESISTANT TO ABRASION

This is a division of application Ser. No. 513,116 filed Oct. 8, 1974.

FIELD OF INVENTION

This invention relates to a method for rendering surfaces resistant to abrasion. More particularly, it relates to a method for rendering surfaces resistant to abrasion by means of applying thereto a thin curable coating.

Abrasion resistant coatings have been used in the past to improve the mar or scratch resistance of soft substrates. In general, the known abrasion resistant coatings have been primarily used for improving the mar resistance of plastics, e.g., ophtalmic lenses, etc.

Although several compositions and methods have been previously suggested for rendering soft surfaces resistant to abrasion, some of such proposed compositions provide only minimal abrasion resistance. Other of such proposed techniques are not practical for most applications because of cost or processing limitations in applying the coating. Still other proposed coatings require high temperature curing (i.e., over 200° C.).

One early method for imparting abrasion resistance involved the vapor deposition of an inorganic material, such as $SiO_2$, $ZrO_2$, etc., onto a substrate. There were inherent disadvantages with this technique because of its cost and processing limitations. A vacuum chamber was necessary in order to vapor coat onto a substrate. Consequently, the size of the article which could be coated was limited by the size of the vacuum chamber. Additionally, a lengthy process time was required because a single layer of the coating applied by this technique was only a few angstroms thick making it necessary to apply several sequential layers in order to attain a coating of sufficient thickness to impart minimal abrasion resistance to the substrate.

Other inorganic coatings are disclosed in U.S. Pat. Nos. 2,768,909 and 3,460,956. U.S. Pat. No. 2,768,909 discloses a protective coating made by applying a thin layer (1 micron maximum thickness) of a hydrolyzable organic ester of titanium, zirconium, or hafnium to a substrate and then contacting the ester layer with water vapor under such conditions that hydrolysis and polymerization of the ester occur. According to the patent (Col. 2, lines 34–36) coatings "thicker than about one micron begin to lose their transparency, cohesive and adhesive properties."

U.S. Pat. No. 3,460,956 discloses the preparation of a hard coating using a solution of tetraalkyl titanate, solvent, water, and lactic or nitric acid. The water and acid are necessary to hydrolyze the titanate. The coating is heat cured at 500° C.

Other attempts to render substrates resistant to abrasion have involved the application of organic coatings or organic/inorganic coatings. Coatings of the former type are the melamine-aldehyde reaction product coatings disclosed in U.S. Pat. Nos. 2,481,809; 3,575,998; and 3,632,715. Coatings of the latter type are disclosed in U.S. Pat. Nos. 3,324,055; 3,642,681; 3,708,225; and 3,817,905.

U.S. Pat. No. 3,324,055 discloses a coating comprising a reactive organic polymer, an inorganic, totally hydrolyzed polymer, a monomer capable of reacting with either of the polymers, and, optionally, a crosslinking agent.

U.S. Pat. No. 3,642,681 describes the preparation of an abrasion-resistant coating on a polymethylmethacrylate surface by the use of a composition containing hydrolyzed tetraalkyl orthosilicate (i.e., polysilicic acid), at least partially hydrolyzed silane ester, and, preferably, an organic acid (formic, acetic, or propionic). After being applied to the proper surface the composition is cured by heating to 100°–180° C. for 30 minutes to 5 hours.

U.S. Pat. No. 3,708,225 describes a method for rendering a soft surface more resistant to abrasion, the method involving (a) contacting the soft surface with a hydrolyzable organic silicon compound to form a bonding film, and (b) applying to the bonding film a second hydrolyzable silicon compound, and (c) hydrolyzing said second silicon compound to form a silica gel deposit on the bonding film. At Col. 11, lines 45–56, it is stated that silicon halides and other metal halides can be used to catalyze the hydrolysis of the silicon compound.

U.S. Pat. No. 3,817,905 describes a composition useful for providing a protective coating on metal surfaces, the composition comprising (a) zinc, (b) a binder of hydrolyzed silane and hydrolyzable titanium compound, (c) water, and (d) acid. The amount of titanium compound used is said to range from 0.1 to about 5 percent, and more particularly 0.5 to 2 percent, by weight based on the weight of silane. Col. 3, lines 57–62.

The present invention alleviates many of the disadvantages attendant with the prior art techniques.

SUMMARY OF THE INVENTION

The coatings useful in the practice of the present invention are highly abrasion resistant, do not require the hydrolysis of any of the constituents, do not require exposure to extreme temperatures in order to cure, and have good corrosion and solvent resistance. Additionally, they may be provided in any thickness desired. They also exhibit low surface energy so that foreign material coming into contact with the cured coatings either will not adhere to them or will adhere only loosely.

The coatings of the present invention are useful as abrasion or mar resistant coatings for soft substrates such as plastics. They are also useful as protective coatings on substrates such as metal, glass, and ceramics.

In accordance with the present invention there is provided a method for rendering a surface of a substrate resistant to abrasion comprising the steps of:

A. applying to said substrate a thin coating of a composition comprising (i) a reactive silane of the formula $[R^1]_n - Si - [R^2]_{4-n}$, wherein $R^1$ is selected from the group consisting of $CH_2=CH-$, an alkyl group of from 2 to 10 carbon atoms containing an epoxy group, an alkyl ether epoxide group containing up to 10 carbon atoms, and

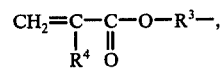

wherein $R^3$ is an alkylene group having from 1 to 8 carbon atoms, and $R^4$ is hydrogen or an alkyl radical having from 1 to 8 carbon atoms; $R^2$ is an alkoxy or acetoxy group; and n is a positive integer of 1 to 3; and (ii) a metal ester having the formula $M-[OR]_x$, wherein M is selected from the group consisting of titanium, aluminum, zirconium; R is an alkyl radical having from 1 to 8 carbon atoms; x is equal to the number of valence bonds of M; and B. curing said composition so as to form an insoluble abrasion resistant coating which is firmly bonded to said substrate.

BRIEF DESCRIPTION OF THE DRAWING

The FIGURE illustrates an apparatus and its use for testing the abrasion resistance of coatings applied in accordance with the invention.

DETAILED DESCRIPTION OF THE INVENTION

Figure 1:
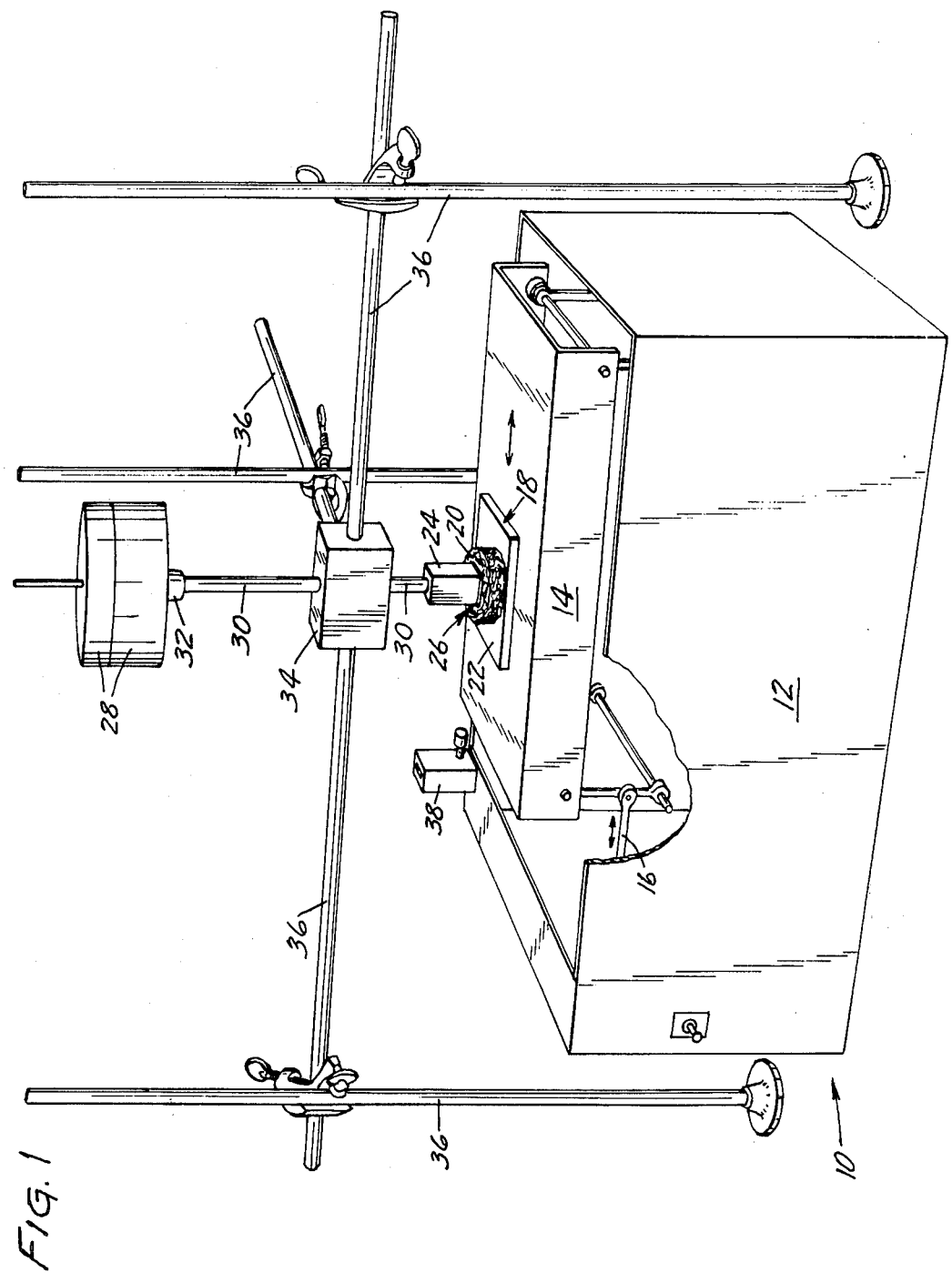

The coating compositions used in the practice of this invention are prepared by simply admixing or blending the metal ester with the reactive silane at room temperature (e.g., 25° C.). Substances which accelerate the curing reaction of the metal ester with the silane may also be simply added to the composition. Other additives such as leveling agents, colorants, viscosity modifiers, etc., may also be included in the composition by simple mixing.

The preferred order of addition of the ingredients is to add the metal ester to the reactive silane, or to the mixture of the reactive silane and leveling agents, colorants, viscosity modifiers, etc. Substances which accelerate the curing reaction are preferably added last.

Typically, after admixing or blending, the clear coating composition is filtered through a 10 micron filter and then applied to the substrate. Although the coating compositions may be prepared and stored at 0° C. or lower for at least seven days before being applied to a substrate, with no adverse effect upon either curability or final properties, they are usually used shortly after they are prepared.

It is preferred that the reactants in the coating compositions not be hydrolyzed. Although reactants which are partially hydrolyzed can be used, the amount of water which may be present in the compositions must not be more than one-half equivalent per equivalent of metal ester. For example, use of water over this amount in compositions containing titanium ester results in formation of titanium dioxide which readily precipitates out of the composition. Another disadvantage with the use of hydrolyzed reactants is that an additional step is required in the preparation of the coating compositions. Furthermore, hydrolyzed reactants do not possess the desirable shelf stability exhibited by unhydrolyzed reactants.

Reactive silanes which are useful in the practice of this invention are those represented by the formula $[R^1]_n — Si — [R^2]_{4-n}$. In the formula, $R^1$ is selected from the group consisting of $CH_2=CH—$, an alkyl group from 2 to 10 carbon atoms containing an epoxy group, an alkyl ether epoxide group containing up to 10 carbon atoms, and

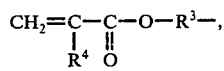

wherein $R^3$ is an alkylene group having from 1 to 8 carbon atoms, and $R^4$ is hydrogen or an alkyl radical having from 1 to 8 carbon atoms; $R^2$ is an alkoxy or an acetoxy group, and n is a positive integer from 1 to 3.

To be useful in the present invention, it is preferred that the silanes be liquids of high purity. Purity may be determined by measuring the index of refraction of the silane.

Silanes which have been found useful in the practice of the present invention include vinyltriethoxy silane ("A-151" commercially available from Union Carbide); vinyltris (2-methoxyethoxy) silane ("A-172" commercially available from Union Carbide); gamma-methacryloxy-propyltrimethoxy silane ("A-174" commercially available from Union Carbide); beta-(3,4-epoxycyclohexyl) ethyltrimethoxy silane ("A-186" commercially available from Union Carbide); gamma-glycidoxypropyltrimethoxy silane ("A-187" commercially available from Union Carbide, or "Z-6040" commercially available from Dow Chemical Co.); and vinyltriacetoxy silane. Other useful silanes of the type described are known to the art. The reactive silanes may be utilized alone, or in combination, in the practice of the present invention. The preferred reactive silane is gamma-glycidoxypropyltrimethoxy silane.

The metal esters which have been found useful in the practice of the present invention may be represented by the formula $M—(OR)_x$, where M is selected from the group consisting of titanium, aluminum, and zirconium, R is selected from the group consisting of lower alkyl radicals containing from 1 to 8 carbon atoms which are bonded to the oxygen atom, and x is equal to the number of valence bonds of M.

Representative metal esters which have been found useful in the practice of the present invention include tetraisopropyl titanate ("Tyzor", commercially available from DuPont); tetrabutyl titanate, tetraethyl titanate, tetra 2-ethylhexyl titanate, aluminum isopropoxide, aluminum n-butoxide, and tetraiosopropyl zirconate. Each of the metal esters may be utilized by itself, or in combination, in the practice of the present invention. Other useful metal esters of the type described are known to the art. The preferred metal ester is tetraisopropyl titanate.

It has been found that the molar ratios of the metal ester to the reactive silane may be varied depending upon the coating system chosen. For example, in the compositions containing the titanium ester and an epoxy-functional silane, the molar ratio of metal ester to silane may vary from about 1:0.5 to about 1:7 with the most preferred ratio being 1:4. In compositions containing the titanium ester and acryloxy-functional silane, the molar ratio may vary from about 1:3 to about 1:15, while the preferred molar ratio may vary from about 1:3 to about 1:7 with the most preferred ratio being about 1:4. With the compositions containing the titanium ester and vinyl-functional silane, the useful molar ratio of metal ester to silane is about 1:4. Other molar ratios of metal ester to reactive silanes are given in Table I.

TABLE I

| COATING COMPOSITION | MOLAR RATIO METAL ESTER TO REACTIVE SILANE | | |
|---|---|---|---|
| | Useful Range | Preferred Range | Most Preferred Ratio |
| Al-ester/epoxy-functional silane | 1:1 to 1:5 | 1:2 to 1:5 | 1:4 |
| Al-ester/acryloxy-functional silane | 1:1 to 1:10 | 1:2 to 1:5 | 1:4 |
| Zr-ester/epoxy-functional silane | 1:3.5 to 1:4.5 | 1:4 | 1:4 |
| Zr-ester/acryloxy-functional silane | 1:3.5 to 1:4.5 | 1:4 | 1:4 |

Various ingredients may be incorporated into the coating compositions, if desired. For example, pigments or dyes may be incorporated in order to provide a colored coating. Solvents may be added to the coating composition in order to facilitate the addition of solid metal esters. Solvents, or other viscosity modifiers, may also be added to adjust the viscosity of the uncured composition. Various conventional leveling agents may also be added to the coating composition. These may be useful in producing a high quality optical grade coating. Furthermore, various accelerators may be added to the compositions in order to speed the curing process.

In order to reduce the viscosity of the coating compositions in the practice of the invention there may be added solvents such as the lower alcohols, lower carboxylic acids, halogenated hydrocarbon solvents, and aromatic solvents. These include ethanol, methanol, tert-butanol, chloroform, methylene chloride, acetic acid, toluene, benzene, xylene, trichloroethane, 1,2-dichloroethane, etc. Other useful solvents of the type described are known to the art. The amount of solvent added is dependent upon the particular metal ester used and the coating viscosity desired.

In order to increase the viscosity of the coating compositions there may be added oligomerized silane in an amount ranging from 1–20% by weight of said composition. For example, gamma-methacryloxypropyl-trimethoxysilane which is prepolymerized by a free radical mechanism at 100° C. for about 20 minutes and diluted to a 50% solution in ethyl alcohol is useful in increasing the viscosity of the coating composition by addition thereto.

Leveling agents are also useful in the practice of the invention in that they level ridges formed in the coating during the coating process. Leveling agents which have been found useful in the practice of the present invention include "SF-1023", a silicon based surfactant available from General Electric; "FC-430" and "FC-431", fluorocarbonbased surfactants available from Minnesota Mining and Manufacturing Co., etc. Preferably, these leveling agents are present at about 0.3 weight percent of the coating solution, although more or less may be used if desired. A preferred leveling agent is "SF-1023".

The coating compositions used in this invention may be applied to a wide variety of substrates to impart abrasion resistance, solvent resistance, corrosion resistance and to impart release characteristics to the surface. In general the type of substrates that may be coated in accordance with this invention include rigid and flexible substrates such as: plastics, glass, metal and ceramics. For example, soft substrates such as plastics can be rendered very mar and abrasion resistant by the practice of this invention. Representation examples include: lenses used in ophthalmic spectacles, sunglasses, optical instruments, illuminators, watch crystals and the like; plastic window glazing; signs and decorative surfaces. Metal surfaces can be rendered resistant to corrosion by the practice of this invention whereby the brilliance of polish may be maintained on decorative metal strips and front surface mirrors. Further, the coating can be colored and be applied to metal as a paint.

Solvent resistance is imparted to otherwise soluble substrates by the practice of this invention. Aircraft windows, for example, can be protected from fuel spillage. Metal containers may be protected from the action of acids.

By the practice of this invention substrates can have imparted release characteristics enabling them to be readily cleaned.

Specific substrates which are readily coated in accordance with this invention include for example: plastics such as polydiallylglycol carbonate, cellulosic esters (e.g., cellulose acetate butyrate, cellulose acetate, etc.), polycarbonate, polyphenyl ethers, polyacrylonitrile-butadiene-styrene copolymers, polyvinylchloride, polystyrene, acrylic polymers (e.g., polymethylmethacrylate, etc.), polyester polymers (e.g., polyethylene terephthalate, etc.), polyolefins, (e.g., polyethylene, polypropylene, etc.), fluorocarbon polymers, polyimides, polyamides, polyacetals and others known to the art; metals such as: aluminum, copper, zinc, iron, chromium, nickel, gold, silver, platinum, lead and alloys to name a few. Ceramics such as: berrylium oxide, aluminum oxide and associated glazes. Glasses such as: quartz, flint, crown, silica, etc.

It has been found that the coating compositions utilized in the present invention have excellent natural adhesion to a variety of unmodified substrates depending upon the coating composition chosen. For example, Ti-ester/epoxy-functional silane coating compositions have excellent natural adhesion to polydiallylglycolcarbonate, cellulosic esters, polyphenyl ethers, and glass. Ti-ester/acryloxy-functional silane coating compositions have excellent natural adhesion to polydiallylglycolcarbonate, cellulosic esters, polyphenyl ethers, polyacrylonitrile-butadiene-styrene copolymers, polycarbonate, polyvinyl chloride, and polystyrene. Ti-ester/vinyl-functional silane coating compositions have excellent natural adhesion to polydiallylglycolcarbonate, cellulosic esters, polyphenyl ethers, and acrylic polymers. Al-ester/acryloxy-functional silane coating compositions have excellent natural adhesion to polydiallylglycolcarbonate, cellulosic esters, polyphenyl ethers, and polyacrylonitrile-butadiene-styrene copolymers.

Those substrates to which the coatings of the invention do not exhibit excellent natural adhesion may nevertheless be readily coated in accordance with this invention, with resultant excellent adhesion thereto, by first modifying the surface thereof. Such modifying techniques include roughening of the surface (e.g., by mechanical means, by solvent, by chemical etching, oxidation, etc.), or by application to such surface of conventional priming agents.

The coatings of the present invention may be applied to a substrate in any desired thickness. It has been found that coatings of between about 3 and 5 microns offer excellent abrasion resistance. However, thicker coatings (e.g., up to 20 microns or more) may be obtained by applying successive layers of the coating to the substrate. This may be done by applying a layer of the coating composition to the substrate and then partially curing it, for example, by heating it for about one minute at about 75° C. A second layer of the coating may then be applied. This procedure may be repeated until the desired coating thickness is attained. These multiple coatings offer much higher resistance to abrasion than do single coatings.

Various methods may be employed to cure the coatings of the present invention. For example, they may be cured by heat, exposure to ultraviolet light, or exposure to electron beam radiation. The particular method used is dependent upon the coating being applied, and the substrate being coated.

All of the coating compositions will cure when exposed to heat. However, the exposure conditions may vary depending upon the coating composition used. For example, the vinyl-functional and acryloxy-functional silane/metal ester coatings require exposure to temperatures between about 130° C. to 170° C. and preferably, about 150° C. for periods of time between about 30 to 60 minutes. Epoxy-functional silane/metal ester coatings can be cured by exposure to temperatures between 75° C. to 100° C. for periods of time from between about 16 to 40 hours. As the curing temperature is increased the time necessary to cure the composition is decreased.

It has been found that the amount of time necessary to cure these coatings at these temperatures can be materially reduced by the addition of a small amount of an accelerator to the composition. The accelerators have been found useful in the range of from about 0.4 to about 2.5%, by weight of the coating composition. Accelerators which have been found useful are the mineral acids such as hydrochloric, nitric, sulfuric, etc. Other acids which have been found useful include boron trifluoride and aluminum trichloride.

All of the coating compositions containing titanium metal esters will cure when exposed to ultraviolet light. It is preferable that the irradiation be carried out in an inert atmosphere such as nitrogen, carbon dioxide, helium, argon, etc. since oxygen inhibits the reaction. The amount of time necessary to completely cure the coatings varies inversely with the intensity of the light. For example, irradiation may be effected by shining a General Electric 275 watt sun lamp through a quartz glass cover into a nitrogen purged chamber containing the coated substrate. The quartz glass cover allows the passage of ultraviolet light in the range of about 2,000 to about 4,000 angstroms. Curing is complete in from 5 to 20 minutes depending upon the distance from the light source to the substrate.

Vinyl-functional and acryloxy-functional silane/metal ester coatings will also cure when exposed to electron beam irradiation. It is desirable to carry out the irradiation in an inert atmosphere such as nitrogen, carbon dioxide, helium, argon, etc. The amount of time necessary to completely cure the coatings varies inversely with the power of the electron beam source. Irradiation may be effected, for example, by passing the coated substrate through a chamber purged with an inert gas into which a stream of electron beams is directed. The source of the electron beams may be a Model CB-150 Electro-Curtain available from Energy Sciences, Incorporated, Burlington, Massachusetts. Typically, the coatings are cured in about 4 seconds.

The unexpected resistance to abrasion exhibited by the coatings prepared in accordance with the present invention is shown by the Oscillating Abrader Test. This test is performed on the oscillating abrader apparatus shown in FIG. 1.

The oscillating abrader apparatus 10 comprises shaker table 14 in housing 12. Table 14 is connected to motor driven oscillating means via arm 16. Such oscillating apparatus 10 is commercially available from Eberbach Corporation as Model 6000. Table 14 oscillates at a frequency of 1.25 cycles per second and a stroke of 3.75 cm.

A coated substrate 18 to be tested is first firmly fastened to the top of table 14 by means of double coated tape. Abrasive means 20 is pressed against the coated surface 22 of substrate 18 and is anchored to the base of abrader block 24 by means of double coated tape. Abrasive means 20 comprises 3/0 grade steel wool. The base 26 of block 24 is 2.5 cm by 2.5 cm. and the portion of abrasive means 20 which is in pressure-contact with surface 22 is therefore about 2.5 cm. by 2.5 cm. The desired abrasive force to be applied is controlled by means of weights 28 supported on rod 30 by means of ring 32. Rod 30 is connected to block 24. Weights 28 are maintained directly above block 24 by means of a suitable bushing 34 held by arms 36, the bushing permitting unrestricted vertical movement while preventing horizontal movement of block 24.

Abrasion resistance is measured by fastening a coated substrate 18 to the top of table 14 as described above and pressing abrasive means 20 against the coated surface 22 and applying a predetermined abrasive force by means of weights 28. The oscillating motion of table 14 is started. The number of complete oscillations is counted by means of counter 38. When 100 cycles (a cycle being one complete forward and back movement) are completed the oscillating table is stopped and the surface 22 of the coated substrate 18 is visually inspected for scratches. Weights 28 are then either increased or decreased incrementally and the procedure is repeated on an unabraded portion of the test sample.

The maximum weight (including block 24, rod 30, ring 32, and weights 28) which can be placed on abrasive means 20 without producing visible scratches on the test sample after 100 cycles is recorded. Since the area of the base of block 24 (and, hence, the abrasive means 20) is one square inch, the abrasion resistance value can also be referred to as pounds per square inch.

Adhesion of the cured coatings to the substrate is measured by cutting the cured, coated surface through with a sharp edge in a series of parallel lines about 0.318 cm. apart and then with a similar series of parallel lines at right angles to the first series, also spaced about 0.318 cm. apart. A total of fifty squares are thereby cut through the cured, coated substrate. A section of "Scotch" Brand Magic Transparent Tape No. 810 is firmly pressed into contact with the coated surface so as to cover the entire cross-hatched area. The tape is then rapidly manually stripped from the substrate at a 90° angle to it. Adhesion is rated at 0 to 100 percent. For each square which is removed during the test, the recorded adhesion value is reduced by 2 percent.

The following examples are meant to illustrate, but not limit this invention. Parts and percentages are by weight unless otherwise indicated.

EXAMPLE 1

A clear coating composition is prepared by adding tetraisopropyl titanate ("Tyzor," commercially available from du Pont) to gamma-methacryloxypropyltrimethoxy silane ("A-174," commercially available from Union Carbide) in a glass beaker, at a molar ratio of 1:10, followed by mixing at room temperature. The resulting coating composition is spin coated onto the surface of a sheet of polydiallylglycolcarbonate and cured by exposure to ultraviolet light in a nitrogen purged chamber. The ultraviolet light source is a General Electric 275 watt sun lamp covered with a quartz glass cover which permits the passage of ultraviolet light in the wavelength range of 2000 to 4000 angstroms. The coated substrate is exposed for 15 minutes at a distance of about 7.5 cm.

The cured coating (approximately 3-5 microns thick) is clear, smooth, and transparent and is firmly bonded to the substrate. The coating is also very abrasion resistant (exhibiting an abrasion resistance of 10 p.s.i. on the Oscillating Abrader), very solvent resistant, and very corrosion resistant.

EXAMPLE 2

A sheet of polydiallylglycolcarbonate is primed by applying thereto (by means of spin coating) a 0.5% solution of an amidized and epoxidized polybutadiene in methanol, followed by heat curing at 150° C. for 2 minutes.

A clear coating composition containing a 1:10 molar ratio of tetraisopropyl titanate to gamma-glycidoxypropyltrimethoxy silane ("Z-6040," commercially available from Dow Chemical) is prepared as described in Example 1 and then spin coated onto the primed substrate. The coated substrate then cured at 75° C. for 16 hours. The cured coating is (approximately 3–5 microns thick) is clear, smooth, transparent and is firmly bonded to the substrate. The coating is also highly abrasion-resistant (exhibiting an abrasion resistance of 30 p.s.i. on the Oscillating Abrader), very solvent-resistant, and very corrosion resistant.

EXAMPLE 3

A dry box is equipped with a container of reactive silane, metal ester, mixing beaker, balance, U.V. light curing chamber, and several sheets of polydiallylglycolcarbonate which are 5 cm. × 5 cm. × 0.16 cm. Open trays of calcium sulfate (a dessicant) are also placed in the box which is then purged with dry nitrogen for 16 hours.

A coating composition is prepared in the dry box by mixing tetraisopropyl titanate with gamma-glycidoxypropyltrimethoxy silane, at a molar ratio of '1:4, in the glass beaker. The resulting coating composition is then flow coated onto the polydiallyglycolcarbonate in the dry box and cured by exposure to ultraviolet light (in the manner described in Example 1) for a period of 15 minutes at a distance of about 7.5 cm.

The cured coating (approximately 3–5 microns thick) is clear, smooth, and transparent and is firmly bonded to the substrate. The coating is also very abrasion-resistant (exhibiting an abrasion-resistance of 15 p.s.i. on the Oscillating Abrader), very solvent resistant, and very corrosion resistant.

EXAMPLES 4–10

Aluminum isopropoxide (0.1 mole) is heated to melting, 117°–120° C, and then dissolved in 80 gm. of toluene heated to 80° C. Dissolution requires approximately 0.5 hours. The Aluminum isopropoxide/toluene solution is then filtered through a Buchner funnel containing "No. 1 Whatman" filter paper. The resulting solution is clear and colorless. The Aluminum isopropoxide/toluene solution is then mixed with gamma-glycidoxypropyltrimethoxy silane in a glass beaker, at the molar ratios set forth in TABLE II, and spin coated onto 5 cm. × 5 cm. × 0.16 cm. sheets of polydiallylglycolcarbonate. The coated samples are then cured in an oven at 85° C. for 16 hours. The cured coating (approximately 3–5 microns thick) is clear, smooth, and transparent. The coatings are also very solvent resistant and very corrosion resistant. Results of the abrasion test are shown in TABLE II.

TABLE II

| Example | 4 | 5 | 6 | 7 | 8 | 9 | 10 |
|---|---|---|---|---|---|---|---|
| Molar Ratio Metal Ester: Reactive Silane | 1:1 | 1:2 | 1:3 | 1:4 | 1:5 | 1:7 | 1:10 |
| Abrasion Resistance (PSI) | 10 | 15 | 20 | 25 | 20 | 5 | 0 |

EXAMPLES 11–20

Aluminum isopropoxide (0.1 mole) is heated to melting and dissolved in 80 gm. of hot toluene as described in Examples 4–10. The toluene-Aluminum isopropoxide solution is filtered through a Buchner funnel containing "No. 1 Whatman" filter paper. The resulting solutions are then mixed with gammamethacryloxypropyltrimethoxy silane in a glass beaker and spin coated onto polydiallylglycolcarbonate. The coated samples are then cured in an oven at 150° C. for 60 min. The cured coatings (approximately 3–5 microns thick) are clear, smooth, transparent and are firmly bonded to the substrate. They are also very solvent resistant and very corrosion resistant. Results of the abrasion test and adhesion test are shown in TABLE III.

TABLE III

| Example | 11 | 12 | 13 | 14 | 15 | 16 | 17 | 18 | 19 | 20 |
|---|---|---|---|---|---|---|---|---|---|---|
| Molar Ratio Metal Ester: Reactive Silane | 1:1 | 1:2 | 1:3 | 1:4 | 1:5 | 1:7 | 1:10 | 1:15 | 1:20 | 1:30 |
| Abrasion Resistance (psi) | 12 | 30 | 17 | 25 | 12 | 15 | 12 | 10 | 10 | 7 |
| Adhesion (%) | 100 | 100 | 100 | 100 | 100 | 100 | 100 | 100 | 100 | 100 |

EXAMPLE 21

A 5 cm. × 5 cm. × 0.64 cm. sheet of polycarbonate ("Lexan," commercially available from General Electric) is washed with absolute ethyl alcohol and then dried with a lint free towel. A coating solution of the following formula was prepared as described in Example 1.

| | |
|---|---|
| Tetraisopropyl titanate | 2 gm. |
| Gamma-glycidoxypropyltrimethoxy silane | 3 gm. |
| Gamma-methacryloxypropyltrimethoxy silane | 3 gm. |
| HCl (Concentrated) | 4 drops |
| "SF-1023" (silicone leveling agent commercially available from General Electric) | 1 drop |

The coating is then spin coated onto the polycarbonate and placed in an oven for 15 minutes at 150° C. The cure is then completed by placing the partially cured substrate into a nitrogen purged chamber and exposing it to ultraviolet light using the apparatus described in Example 1 for 15 minutes at a distance of about 7.5 cm. The cured coating (approximately 3–5 microns thick) ic clear, smooth, transparent and is firmly bonded to the substrate. The coating is also very abrasion resistant (exhibiting an abrasion resistance of 30 p.s.i. on the oscillating abrader), very solvent resistant and very corrosion resistant.

EXAMPLE 22

A 5 cm. × 5 cm. × 0.64 cm. sheet of polydiallylglycolcarbonate is primed as described in Example 2. An aluminum isopropoxide solution is prepared as described in Examples 4–10. A coating solution is prepared by mixing the following reactants in a glass beaker at room temperature.

| | |
|---|---|
| Aluminum isopropoxide in toluene (0.003 moles) | 3 gm. |
| Tetraisopropyltitanate (0.004 moles) | 1 gm. |
| Gamma-glycidoxypropyltrimethoxy silane (0.028 moles) | 6.6 gm. |
| Silicone leveling agent | 1 drop |

The coating is then spin coated onto the substrate and cured in an oven for 16 hours at 90° C. The cured coating (approximately 3–5 microns thick) is clear, smooth, transparent and is firmly bonded to the substrate. The coating is also very abrasion resistant (exhibiting the abrasion resistance of 25 p.s.i. on the oscillating abrader), very solvent resistant and very corrosion resistant.

EXAMPLES 23–32

Coating compositions are prepared by mixing tetraisopropyltitanate with gamma-methacryloxypropyltrimethoxy silane in a glass beaker at room temperature at various molar ratios. The resulting coating compositions are then spin coated onto polycarbonate and cured as described in Example 21. The cured coatings (approximately 3–5 microns thick) are clear, smooth, transparent and firmly bonded to the substrate. They are also very solvent resistant and very corrosion resistant. Results of the abrasion test and adhesion test are shown in TABLE IV.

TABLE IV

| Example | 23 | 24 | 25 | 26 | 27 | 28 | 29 | 30 | 31 | 32 |
|---|---|---|---|---|---|---|---|---|---|---|
| Molar Ratio Metal Ester: Reactive Silane | 1:1 | 1:2 | 1:3 | 1:4 | 1:5 | 1:7 | 1:10 | 1:15 | 1:20 | 1:30 |
| Abrasion Resistance (p.s.i.) | 2 | 3 | 15 | 30 | 25 | 15 | 14 | 10 | 9 | 3 |
| Adhesion (%) | 100 | 100 | 100 | 100 | 100 | 100 | 100 | 100 | 100 | 100 |

EXAMPLES 33–41

Coating compositions are prepared by mixing tetraisopropyltitanate with gamma-glycidoxypropyltrimethoxy silane in a glass beaker at various molar ratios at room temperature. The resulting coating compositions are then spin coated onto polydiallylglycolcarbonate and partially cured by exposure to ultraviolet light as described in Example 1 for 4 minutes at a distance of about 7.5 cm. The cure is then completed by exposure to 85° C. for 16 hours. The cured coatings (approximately 3–5 microns thick) are clear, smooth, transparent, and firmly bonded to the substrate. Results of the abrasion test and adhesion test are shown in TABLE V. They are also very solvent resistant and very corrosion resistant.

TABLE V

| Example | 33 | 34 | 35 | 36 | 37 | 38 | 39 | 40 | 41 |
|---|---|---|---|---|---|---|---|---|---|
| Molar Ratio Metal Ester: Reactive Silanes | 1:0.5 | 1:1.5 | 1:4 | 1:5 | 1:6 | 1:10 | 1:15 | 1:20 | 1:30 |
| Abrasion Resistance (psi) | 32 | 32 | 35 | 20 | 18 | 4 | 6 | 3 | 2 |
| Adhesion (%) | 100 | 100 | 100 | 100 | 100 | 100 | 100 | 100 | 100 |

EXAMPLES 42–43

Substrates precoated with commercially available abrasion-resistant coatings are obtained and tested for abrasion resistance on the oscillating abrader. The results are shown in TABLE VI.

TABLE VI

| Example | 42 | 43 |
|---|---|---|
| Coating/Substrate | General Electric "MR-4000", an organic melamine type coating, on "Lexan" Polycarbonate | du Pont "Abcite", a silicon fluorocarbon hard coat, on polymethylmethacrylate |
| Pressure required to abrade (PSI) | 2 | 10 |

EXAMPLE 44

A 5 cm. × 5 cm. × 0.16 cm. sheet of polydiallylglycolcarbonate is washed with absolute ethyl alcohol and dried with a lint free towel. A coating composition is prepared in a glass breaker at room temperature and spin coated onto the substrate. The coating composition comprises.

| | |
|---|---|
| Tetraisopropyl titanate | 1.75 gm. |
| Gamma-glycidoxypropyltrimethoxy silane | 6.0 gm. |
| Borontrifluoride ether complex | 4.0 drops |
| Silicone leveling agent | 1.0 drop |

The coated substrate is partially cured by placing it into a nitrogen purged chamber and exposing it to ultraviolet light as described in Example 1 for 4 minutes at a distance of about 7.5 cm. The cure is completed by exposure to 85° C for 8 hours. The cured coating (approximately 3–5 microns thick) is clear, smooth, transparent and firmly bonded to the substrate. The coating is also very abrasion resistant (exhibiting an abrasion resistance of 25 p.s.i. on the oscillating abrader), very solvent resistant and very corrosion resistant.

EXAMPLE 45

A 5 cm. × 5 cm. × 0.16 cm. sheet of polydiallylglycolcarbonate is washed with absolute ethyl alcohol and dried with a lint free towel. A coating composition is then prepared in a glass beaker at room temperature and spin coated onto the substrate. The coating composition comprises.

| | |
|---|---|
| Tetraisopropyl titanate | 1.75 gms. |

| | |
|---|---|
| Gamma-glycidoxypropyltrimethoxy silane | 6.0 gms. |
| Silicone leveling agents | 1.0 drop |

The coated substrate is partially cured by placing it into a nitrogen purged chamber and exposing it to ultraviolet light as described in Example 1 for four minutes at a distance of about 7.5 cm. The cure is completed by exposure to 85° C for 16 hours. The cured coating (approximately 3-5 microns thick) is clear, smooth, transparent and is firmly bonded to the substrate. The sample is then placed into a detergent bath having a pH of 9 for 5 days. After removal from the detergent bath, the cured coated substrate remains clear, smooth, transparent, and firmly bonded to the substrate. The coating is still very abrasion resistant (exhibiting a resistance of 22 p.s.i. on the oscillating abrader).

EXAMPLE 46

Zirconiumisopropoxide (33 grams) is dissolved in toluene (167 grams) heated to approximately 75° C. The warm solution is filtered using the Buchner funnel and "No. 1 Whatman" filter paper. A 5 cm. × 5 cm. × 0.16 cm. sheet of polydiallylglycolcarbonate is washed with absolute ethyl alcohol and dried with a lint free towel. The coating composition is then prepared in a glass beaker at room temperature and spin coated onto the substrate. The coating composition comprises:

| | |
|---|---|
| Zirconium isopropoxide-toluene solution | 12.0 gms. |
| Gamma-methacryloxypropyltrimethoxy silane | 6.0 gms. |
| Silicone leveling agent | 1.0 drop |

The coated substrate is cured by exposure to 140° C for 60 minutes. The cured coating (approximately 3-5 microns thick) is clear, smooth, transparent and is firmly bonded to the substrate. The coating is also very abrasion resistant (exhibiting an abrasion resistance of 12 p.s.i. on the oscillating abrader), very solvent resistant and very corrosion resistant.

EXAMPLE 47

A 5 cm. × 5 cm. × 0.16 cm. sheet of polymethylmethacrylate is washed with absolute ethyl alcohol and dried with a lint free towel. A coating solution is then prepared in a glass beaker at room temperature and spin coated onto the substrate. The coating composition comprises:

| | |
|---|---|
| Tetraisopropyltitanate | 1.75 gms. |
| Vinyl-tris-(2-methoxyethoxy) silane ("A-172" commercially available from Union Carbide) | 7.0 gms. |

The coating is cured by electron beam radiation by passing the coated substrate through a chamber purged with nitrogen into which a stream of electron beams is directed. The source of the electron beams is a CB-150 Electro-Curtain available from Energy Sciences, Inc., Burlington, Mass. The Electro-Curtain is operated at 10 milliamperes and 150 kilovolts. The coated substrate is exposed to electron beam radiation for 4 seconds. The cured coating (approximately 3-5 microns thick) is clear, smooth, transparent and is firmly bonded to the substrate. The coating is also very abrasion resistant (exhibiting an abrasion resistance of 10 to 12 p.s.i. on the oscillating abrader), very solvent resistant and very corrosion resistant.

EXAMPLE 48

An aluminum isopropoxide/toluene solution is prepared as described in Examples 4-10. A coating composition is prepared in a glass beaker at room temperature comprising:

| | |
|---|---|
| Aluminum isopropoxide/toluene solution | 6.0 gms. |
| Gamma-glycidoxypropyltrimethoxy silane | 6.0 gms. |
| Silicone leveling agent | 1.0 drop |

The coating solution is spin coated onto the sheet of polydiallylglycolcarbonate primed as described in Example 2. The coated substrate is cured by exposure to 85° C for 16 hours. The cured coating (approximately 3-5 microns thick) is clear, smooth, transparent and is firmly bonded to the substrate. The coating is also highly abrasion resistant (exhibiting an abrasion resistance of 25 p.s.i. on the oscillating abrader) very solvent resistant and very corrosion resistant.

EXAMPLE 49

A coating composition is prepared utilizing partially hydrolyzed tetraisopropyltitarate. The tetraisopropyltitanate is hydrolyzed as follows:
 a. 4.7 gms. 37% (concentrated) HCl is added to 67 gms. absolute ethyl alcohol.
 b. 28.4 gms. (0.1 mole) tetraisopropyl titanate is added to the above solution.
Hydrolysis takes place at room temperature in about 15 minutes. The following materials are then combined at room temperatures to make the coating solution.

| | |
|---|---|
| Hydrolyzed tetraisopropyl titanate solution | 5.0 gms. |
| Gamma-methacryloxypropyltrimethoxy silane | 6.0 gms. |
| Silicone leveling agent | 0.26 gms. |

EXAMPLE 50

A 5 cm. × 7 cm. × 0.16 cm. sheet of aluminum is cleaned with an abrasive pad and water then washed with absolute ethanol and dried with a lint free towel. The coating composition of Example 49 is spin coated onto the surface of the aluminum sheet and cured at 150° C for 60 minutes. The cured coating (approximately 3-5 microns thick) is clear, smooth, transparent and is firmly bonded to the substrate. The coating is also highly abrasion resistant (exhibiting an abrasion resistance of 20 p.s.i. on the oscillating abrader), very solvent resistant, and very corrosion resistant.

EXAMPLE 51

Polyester sheets are etched with a dilute solution of sulfuric acid in absolute ethyl alcohol. The coating composition of Example 49 is spin coated onto the etched polyester sheets and cured at 150° C for 60 minutes. The cured coatings (approximately 3-5 microns thick) are clear, smooth, transparent and are firmly bonded to the substrate. The coating is also highly abrasion resistant, very solvent resistant and very corrosion resistant.

EXAMPLE 52

A sheet of acrylic plastic is submerged in chloroform for 2 minutes, removed, and dried. The coating solution of Example 49 is then spin coated onto the etched substrate and cured at 150° C for 60 minutes. The cured coating (approximately 3-5 microns thick) is clear, smooth, transparent and is also highly abrasion resistant, very solvent resistant and very corrosion resistant.

EXAMPLE 53

Example 52 is repeated using other methods for pretreating the surface of the substrate. These methods are:
 a. Submerging the substrate in dichloromethane (e.g., 30 seconds at 25° C).
 b. Roughening the surface of the substrate with fine sandpaper (410 through 600 grit polishing paper).
 c. Roughening the surface of the substrate with aluminum oxide abrasive powder.

The cured coatings (approximately 3-5 microns thick) are clear, smooth, transparent and are firmly bonded to the substrate. The coatings are highly abrasion resistant, very solvent resistant and very corrosion resistant.

EXAMPLE 54

The surface of a sheet of "Lexan" polycarbonate is treated by roughening it with #600 grit sandpaper. The coating composition of Example 49 is spin coated onto the surface of the polycarbonate and cured by exposure to electron beam radiation as described in Example 47. The time required to cure the coating is 4 seconds. The cured coating (approximately 3-5 microns thick) is clear, smooth, transparent and is firmly bonded to the substrate. The coating is also highly abrasion resistant, very solvent resistant and very corrosion resistant.

EXAMPLE 55

Several 5 cm × 5 cm × 0.32 cm sheets of "Marbon" (a copolymer of vinyl toluene and butadiene, commercially available from Borg-Warner) are washed with absolute ethanol and dried with a lint-free towel. The coating composition of Example 49 is then spin coated onto the surface of the substrate and cured by exposure to electron beam radiation as described in Example 47. The time required to cure the coating is about 4 seconds. The cured coating (approximately 3-5 microns thick) is clear, smooth, transparent and is firmly bonded to the substrate. The coating is also highly abrasion resistant, very solvent resistant, and very corrosion resistant.

EXAMPLE 56

A 5 cm × 5 cm × 0.16 cm sheet of polydiallylglycolcarbonate is washed with absolute ethyl alcohol and dried with a lint-free towel. A coating solution of the following formula is prepared as described in Example 1.

| | |
|---|---|
| Tetraisopropyl titanate | 2 grams |
| Gamma-methacryloxypropyltrimethoxy silane | 6 grams |
| Silicone leveling agent | 1 drop |

The coating is then flow coated onto the substrate and cured by electron beam radiation as described in Example 47. The coating cures in about 4 seconds. The cured coating (approximately 3-5 microns thick) is clear, smooth, transparent and is firmly bonded to the substrate. The coating is highly abrasion resistant, very solvent resistant and very corrosion resistant.

EXAMPLE 57

A sheet of acrylic plastic is spin coated with a 10 percent solution of acrylic plastic in dichloromethane. A thin coating (about 3 microns thick) is obtained. The surface of the acrylic substrate becomes tacky as the dichloromethane evaporates. Then the coating of Example 49 is spin coated onto the substrate and then cured by exposure to ultraviolet light as described in Example 1. The substrate is exposed for 15 minutes at a distance of about 7.5 cm. The cured coating (approximately 3-5 microns thick) is clear, smooth, transparent and is firmly bonded to the substrate. The coating is also very abrasion resistant (exhibiting an abrasion resistance of 10 p.s.i. on the oscillating abrader) very solvent resistant, and very corrosion resistant.

EXAMPLE 58

Example 57 is repeated except that the coating is cured by exposure to 150° C for 60 minutes. The cured coating (approximately 3-5 microns thick) is clear, smooth, transparent and is firmly bonded to the substrate. The coating is also highly abrasion resistant (exhibiting an abrasion resistance of 10 p.s.i. on the oscillating abrader), very solvent resistant and very corrosion resistant.

EXAMPLE 59

Example 57 is repeated except that the coating is cured by exposure first to 150° C for 20 minutes and then exposure to ultraviolet light as described in Example 1 for 15 minutes at a distance of 7.5 cm. The cured coating (approximately 3-5 microns thick) is clear, smooth, transparent and is firmly bonded to the substrate. The coating is also highly abrasion resistant, very solvent resistant and very corrosion resistant.

EXAMPLE 60

Example 57 is repeated except that the following coating solution is applied to the pre-treated substrate:

| | |
|---|---|
| Tetraisopropyl titanate | 2 grams |
| Gamma-methacryloxypropyltrimethoxy silane | 6 grams |
| HCl (Conc.) | 4 drops |
| Silicone leveling agent | 1 drop |

The cured coating (approximately 3-5 microns thick) is clear, smooth, transparent and is firmly bonded to the substrate. The coating is also very abrasion resistant, very solvent resistant and very corrision resistant.

EXAMPLE 61

A coating composition comprising a 1:4 molar ratio of tetraisopropyl titanate to gamma-methacryloxypropyltrimethoxy silane is prepared as described in Example 1. The coating composition is spin coated onto "Lexan" polycarbonate and cured by exposure to 150° C for 20 minutes followed by exposure to ultraviolet light as described in Example 1 for 15 minutes at a distance of about 7.5 cm.

The solvent resistance of the cured coating is then checked by forming four to five small pools of solvent on the coated surface of the substrate, allowing said pools to remain on said surface for about 20 minutes, wiping said pools dry, and visually inspecting for damage to the cured coating. When tested according to this procedure, the cured coating is unaffected by the following solvents:
a. Water
b. Ethanol
c. Methanol
d. Acetone
e. 2-Butanone
f. Chloroform
g. Dimethyl formamide
h. HCl (concentrated)
i. Toluene

EXAMPLE 62

A sheet of polydiallylglycolcarbonate is washed with absolute ethyl alcohol and dried with a lint-free towel. The sheet is primed as described in Exaple 2. A coating composition is prepared in a glass beaker at room temperature and spin coated onto the primed substrate. The coating composition comprises:

| | |
|---|---|
| Tetraisopropyl titanate | 2.0 grams |
| Gamma-glycidoxypropyltrimethoxy silane | 6.0 grams |
| Silicone leveling agent | 1.0 drop |

The coating is partially cured by exposure to 75° C for one minute. The sample is then cooled to room temperature (e.g., 25° C) and then re-coated with the coating composition using the spin coating technique, followed by partial curing of the second layer by exposure to 75° C for one minute. This procedure is repeated until 4 layers of the coating are applied to the substrate. The multiple layer coating is completely cured by exposure to 85° C for 16 hours. The cured coating (approximately 20 microns thick) is clear, smooth, and transparent and is firmly bonded to the substrate. The coating is also highly abrasion resistant (not being scratched when 50 p.s.i. are applied by the oscillating abrader), very solvent resistant and very corrosion resistant.

EXAMPLE 63

A 10 cm. × 10 cm. × 0.013 cm. sheet of polyester film is primed as described in Example 2. A coating composition is then prepared in a glass beaker at room temperature. The coating comprises:

| | |
|---|---|
| Tetraisopropyl titanate | 2.0 gms. |
| Gamma-glycidoxypropyltrimethoxy silane | 6.0 gms. |
| Silicone leveling agent | 1.0 drop |

The coating composition is spin coated onto the primed substrate and partially cured at 75° C for 1 minute. The coated substrate is cooled to room temperature (e.g. 25° C) and a second layer of the coating composition is spin coated onto the partially cured coating. The multiple coating is cured by exposure to 75° C for 16 hours.

The cured coating (approximately 8 microns thick) is clear, smooth, flexible, transparent and is firmly bonded to the substrate. The coating is also very abrasion resistant (exhibiting an abrasion resistance of 20 p.s.i. on the oscillating abrader), very solvent resistant, and very corrosion resistant.

EXAMPLE 64

A thin sheet of cellulose acetate butyrate film having the dimensions 10 cm. × 10 cm. × 0.013 cm. is washed with hexane and dried with a lint free towel. The coating compound of Example 63 is then spin coated and cured on the substrate as described in Example 63.

The cured coating (approximately 8 microns thick) is clear, smooth, flexible, transparent and is firmly bonded to the substrate. The coating is also very abrasion resistant (exhibiting an abrasion resistance of 20 p.s.i. on the oscillating abrader), very solvent resistant, and very corrosion resistant.

What is claimed is:

1. A method for rendering a surface of a substrate resistant to abrasion comprising the steps of:
    a. applying to said substrate, wherein said substrate is selected from metals and organic polymeric materials, a surface-coating of a composition comprising
       i. a reactive silane of the formula $R^1-Si-R^2_{4-n}$, wherein $R^1$ is elected from the group consisting of $CH_2=CH-$, an alkyl group of from 2 to 10 carbon atoms containing an epoxy group, an alkyl ether epoxide group containing up to 10 carbon atoms, and

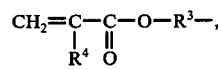

wherein $R^3$ is an alkylene group having from 1 to 8 carbon atoms, and $R^4$ is hydrogen or an alkyl radical having from 1 to 8 carbon atoms; $R^2$ is an alkoxy or acetoxy group; $n$ is a positive integer of 1 to 3; and (ii) a metal ester of the formula $M-(OR)_x$, wherein M is selected from the group consisting of titanium, aluminum, and zirconium; R is an alkyl radical having from 1 to 8 carbon atoms, and $x$ is equal to the number of valence bonds of M; and
    b. curing said composition so as to form an insoluble abrasion-resistant coating which is firmly bonded to the substrate.

2. A method in accordance with claim 1, wherein said reactive silane comprises

3. A method in accordance with claim 2, wherein said metal ester comprises $Ti-(OR)_4$, wherein the mole ratio of said metal ester to said reactive silane is from about 1:0.5 to about 1:7.

4. A method in accordance with claim 3, wherein said composition is cured by exposure to ultraviolet light.

5. A method in accordance with claim 3, wherein said composition is cured by exposure to a temperature and for a time sufficient to form an insoluble abrasion-resistant coating.

6. A method in accordance with claim 3, wherein said composition is partially cured by exposure to ultraviolet light, followed by exposure to a temperature and for a time sufficient to form an insoluble abrasion-resistant coating.

7. A method in accordance with claim 1, wherein said metal ester is selected from the group consisting of tetraisopropyl titanate, tetrabutyl titanate, tetra 2-ethylhexyl titanate, and tetraethyl titanate.

8. A method in accordance with claim 7, wherein said metal ester comprises tetraisopropyl titanate.

9. A method in accordance with claim wherein wherein said metal ester is $Al(OR)_3$ and werein the mole ratio of said metal ester to said silane is in the range of about 1:1 to 1:5.

10. A method in accordance with claim 9, wherein said composition is cured by exposure to a temperature and for a time sufficient to form an insoluble abrasion-resistant coating.

11. A method in accordance with claim 9, wherein said metal ester is selected from the group consisting of aluminum isopropoxide and aluminum n-butoxide.

12. A method in accordance with claim 9, wherein said mole ratio is in the range of about 1:2 to 1:5.

13. A method in accordance with claim 11, wherein said metal ester comprises aluminum isopropoxide.

14. A method in accordance with claim 2, wherein said metal ester comprises $Zr(OR)_4$ and wherein the mole ratio of said metal ester to said silane is 1:4.

15. A method in accordance with claim 14, wherein said metal ester comprises tetraisopropyl zirconate.

16. A method in accordance with claim 14, wherein said composition is cured by exposure to a temperature and for a time sufficient to form an insoluble abrasion-resistant coating.

17. A method in accordance with claim 1, wherein said silane is of the formula

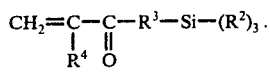

18. A method in accordance with claim 17, wherein said metal esters are selected from the group consisting of tetraisopropyl titanate, tetrabutyl titanate, tetra2-ethylhexyl titanate, tetraethyl titanate, aluminum isopropoxide, aluminum n-butoxide, and tetraisopropyl zirconate.

19. A method in accordance with claim 17, wherein said silane is of the formula

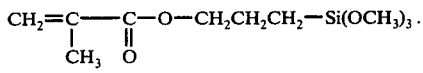

20. A method in accordance with claim 19, wherein said metal ester is $Ti(OR)_4$ and wherein the mole ratio of metal ester to silane is in the range of about 1:3 to 1:15.

21. A method in accordance with claim 20, wherein said composition is cured by exposure to ultraviolet light for a time sufficient to form an insoluble abrasion-resistant coating.

22. A method in accordance with claim 20, wherein said composition is cured by exposure to a temperature and for a time sufficient to form an insoluble abrasion-resistant coating.

23. A method in accordance with claim 20, wherein said composition is cured by exposure to electron beam irradiation at an intensity and for a time sufficient to form an insoluble abrasion-resistant coating.

24. A method in accordance with claim 20 wherein said composition is partially cured by exposure to heat, followed by exposure to ultraviolet light to form an insoluble abrasion-resistant coating.

25. A method in accordance with claim 20 wherein said composition is partially cured by exposure to ultraviolet light, followed by exposure to heat.

26. A method in accordance with claim 20, wherein the mole ratio of metal ester to silane is in the range of 1:3 to 1:7.

27. A method in accordance with claim 26, wherein said metal ester is tetraisopropyl titanate.

28. A method in accordance with claim 19, wherein said metal ester is $Al(OR)_3$ and wherein the mole ratio of metal ester to silane is in the range of about 1:1 to 1:10.

29. A method in accordance with claim 28, wherein said composition is cured by exposure to a temperature and for a time sufficient to form an insoluble abrasion resistant coating.

30. A method in accordance with claim 28, wherein said metal ester is aluminum isopropoxide or aluminum n-butoxide, and wherein said mole ratio is in the range of about 1:2 to 1:5.

31. A method in accordance with claim 19, wherein said metal ester is tetraisopropyl zirconate and said mole ratio is 1:4.

32. A method in accordance with claim 31, wherein said composition is cured by exposure to a temperature and for a time sufficient to form an insoluble abrasion resistant coating.

33. A method in accordance with claim 1, wherein said silane is of the formula

34. A method in accordance with claim 33, wherein said silane is selected from the group consisting of $CH_2=CH-Si(OC_2H_5)_3$ and $CH_2=CH-Si(OC_2H_4OCH_3)_3$, and wherein the mole ratio of metal ester to said silane is 1:4.

35. A method in accordance with claim 34, wherein said metal ester is $Ti(OR)_4$.

36. A method in accordance with claim 35, wherein said composition is cured by exposure to a temperature and for a time sufficient to form an insoluble abrasion resistant coating.

37. A method in accordance with claim 35, wherein said composition is cured by exposure to ultraviolet light.

38. A method in accordance with claim 35, wherein said composition is cured by exposure to electron beam irradiation.

39. A method in accordance with claim 1, wherein said substrate is selected from the group consisting of polydiallylglycol carbonate, cellulosic esters, and aluminum.

40. A method in accordance with claim 1, wherein said substrate is selected from the group consisting of polycarbonate, polyphenyl ethers, polyacrylonitrilebutadiene-styrene copolymers, polyvinylchloride, polystyrene, acrylic polymers, polyester polymers, polyolefins, fluorocarbon polymers, polyimides, polyamides, polyacetals, metal, glass, and ceramics.

41. A method in accordance with claim 1, wherein said composition contains a mixture of $Ti(OR)_4$ and $Al(OR)_3$.

42. A method in accordance with claim 1, wherein said composition contains a mixture of reactive silanes.

43. A method in accordance with claim 1, wherein the surface of said substrate is mechanically roughened prior to the application thereto of said composition.

44. A method in accordance with claim 1, wherein the surface of said substrate is chemically etched.

45. A method in accordance with claim 1, wherein the surface of said substrate is coated with a priming agent prior to the application thereto of said composition.

46. A method in accordance with claim 1, wherein said composition contains an accelerator.

47. A method in accordance with claim 1, wherein the surface of said substrate is mechanically roughened.

48. A method for rendering a surface of a substrate resistant to abrasion comprising the steps of:
  a. applying to said substrate a composition consisting of:
    i. a reactive silane of the formula $R^1_n\text{—Si—}R^2_{4-n}$, wherein $R^1$ is selected from the group consisting of $CH_2\text{=}CH\text{—}$, an alkyl group of from 2 to 10 carbon atoms containing an epoxy group, an alkyl ether epoxide group containing up to 10 carbon atoms, and $$CH_2=\underset{R^4}{\underset{|}{C}}-\underset{O}{\underset{\|}{C}}-O-R^3-,$$

wherein $R^3$ is an alkylene group having from 1 to 8 carbon atoms, and $R^4$ is hydrogen or an alkyl radical having from 1 to 8 carbon atoms; $R^2$ is an alkoxy or acetoxy group; n is a positive integer of 1 to 3; and (ii) a metal ester of the formula $M\text{—}OR)_x$, wherein M is selected from the group consisting of titanium, aluminum, and zirconium; R is an alkyl radical having from 1 to 8 carbon atoms, and x is equal to the number of valence bonds of M; and b. curing said composition so as to form an insoluble abrasion-resistant coating which is firmly bonded to the substrate.

* * * * *

UNITED STATES PATENT AND TRADEMARK OFFICE
CERTIFICATE OF CORRECTION

PATENT NO. : 4,073,967
DATED : February 14, 1978
INVENTOR(S) : Timothy C. Sandvig It is certified that error appears in the above-identified patent and that said Letters Patent are hereby corrected as shown below:

Col. 18, line 15, "$R^1-Si-R^2_{4-n}$," should read --$R^1_n-Si-R^2_{4-n}$--

Col. 18, line 47, "$Ti-OR)_4$" should read --$Ti(OR)_4$--

Col. 18, line 67, "claim wherein" should read --claim 2, wherein--

Col. 21, line 14, "$R^1_n-Si-R^2_n$," should read --$R^1_n-Si-R^2_{4-n}$,--

Col. 22, line 11, "$M-OR)_x$," should read --$M(OR)_x$,--

Signed and Sealed this

Eleventh Day of July 1978

[SEAL]

Attest:

RUTH C. MASON
Attesting Officer

DONALD W. BANNER
Commissioner of Patents and Trademarks